United States Patent
Cromer et al.

(10) Patent No.: US 6,304,900 B1
(45) Date of Patent: Oct. 16, 2001

(54) DATA PROCESSING SYSTEM AND METHOD FOR PERMITTING A SERVER COMPUTER SYSTEM TO REMOTELY MODIFY OPERATION OF A CLIENT SYSTEM'S NETWORK HARDWARE

(75) Inventors: Daryl Carvis Cromer, Cary; Brandon Jon Ellison; Robert Duane Johnson, both of Raleigh; Eric Richard Kern, Durham; Howard Locker, Cary; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/252,363

(22) Filed: Feb. 18, 1999

(51) Int. Cl.[7] ....................................... G06F 11/34
(52) U.S. Cl. ..................... 709/221; 709/224; 709/223; 709/203
(58) Field of Search .................................. 709/220, 221, 709/203, 224, 223

(56) References Cited

U.S. PATENT DOCUMENTS

| | | | | |
|---|---|---|---|---|
| 5,634,008 | * | 5/1997 | Gaffaney et al. | 709/224 |
| 5,751,964 | * | 5/1998 | Ordanic et al. | 709/224 |
| 6,085,243 | * | 7/2000 | Fletcher et al. | 709/224 |
| 6,085,244 | * | 7/2000 | Wookey | 709/224 |
| 6,108,782 | * | 8/2000 | Fletcher et al. | 713/153 |
| 6,182,157 | * | 1/2001 | Schlener et al. | 709/318 |
| 6,192,034 | * | 2/2001 | Hsieh et al. | 370/241 |

OTHER PUBLICATIONS

S. Waldbusser; "Remote Network Monitoring Management Information Base", RFC 1757; pp. 1–79; Feb. 1995.*

P. Dini et al.; "Performance Evaluation for Distributed System Components"; Proceedings of Second IEEE International Workshop on Systems Management; pp. 20–29; Jun. 1996.*

* cited by examiner

Primary Examiner—Kenneth R. Coulter
(74) Attorney, Agent, or Firm—George E. Grosser; Andrew J. Dillon

(57) ABSTRACT

A data processing system and method are described for permitting a server computer system coupled to a client computer system utilizing a network to remotely modify operation of the client computer system's network hardware. A counter is established within the client computer system for counting a plurality of network events. A counter threshold is established. Upon the counter reaching the counter threshold, the client computer system's network hardware transmits a message to the server computer system including network statistics information. The network statistics information includes an indication of the counter reaching the counter threshold. In response to a receipt of the message, the server computer system determines whether to modify the operation of the client's network hardware. In response to a determination to modify operation of the network hardware, the server remotely modifies operation of the client's network hardware.

17 Claims, 7 Drawing Sheets

DATA PROCESSING SYSTEM AND METHOD FOR PERMITTING A SERVER COMPUTER SYSTEM TO REMOTELY MODIFY OPERATION OF A CLIENT SYSTEM'S NETWORK HARDWARE

BACKGROUND OF THE INVENTION

1. Field of the Invention

The present invention relates in general to data processing systems and, in particular, to a data processing system and method including a server and client computer system coupled together utilizing a local area network. Still more particularly, the present invention relates to a data processing system and method including a server and client computer system coupled together utilizing a local area network for permitting the server to remotely modify operation of the client computer system's network hardware.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources.

Currently, network diagnostics programs exist to collect statistics regarding network traffic on a client computer system. One example of such a technology is called Remote Monitoring (RMON). RMON executes within the client computer system only while the client is running. RMON is used to keep track of events and values of counters which may be utilized to analyze the network activity of a particular client computer system. The type of statistics typically collected may include the number of lost packets, retries, time-outs, response time, and throughput.

In known systems, the network performance of a client computer system may be determined by the client computer system during run-time. Therefore, the client must by fully operational during the determination. The determination is made by the software executing within the client which tracks network statistics. If a change to a network parameter within the client is necessary, a network administration must physically go to the particular client, and modify the desired parameter.

An example of a network parameter a network administration may desire to change is the latency on the PCI bus. The network administrator may effectively lower or raise the priority given a particular client's network interface by decreasing or increasing the latency interval on the client's PCI bus. A lower latency value may be acceptable for network intensive uses such as file, print, and proxy servers. However, for client computer systems, it may unbalance the system resulting in overall loss of performance.

Another network parameter a network administration may alter while physically at the client is the size of the buffer. Altering the buffer size will result in a change to the throughput characteristics of the client.

Therefore a need exists for a data processing system and method for a server computer system to remotely and dynamically modify operation of a client: computer system's network hardware.

SUMMARY OF THE INVENTION

A data processing system and method are described for permitting a server computer system coupled to a client computer system utilizing a network to remotely modify operation of the client computer system's network hardware. A counter is established within the client computer system for counting a plurality of network events. A counter threshold is established. Upon the counter reaching the counter threshold, the client computer system's network hardware transmits a message to the server computer system including network statistics information. The network statistics information includes an indication of the counter reaching the counter threshold. In response to a receipt of the message, the server computer system determines whether to modify the operation of the client's network hardware. In response to a determination to modify operation of the network hardware, the server remotely modifies operation of the client's network hardware.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–8 of the drawings, like numerals being used for like and corresponding parts of the accompanying drawings.

The present invention is a method and system for permitting a server computer system to remotely modify operation of a client computer system's network hardware. The server and client are coupled together utilizing a network. The client includes counters and timers which collect data regarding the client's network activity. A threshold is established for each counter and timer within the client which collects network statistics. When one of the counters or timers reaches its associated threshold, the network hardware of the client transmits a message to the server. The message includes the client's network statistics information which includes at least an indication that a particular counter or timer has reached its threshold as well as the current value for that counter or timer.

When the server receives this message, the server determines whether to modify one of a plurality of network parameters utilized by the client's network hardware during operation. The server determines whether such a modification is necessary by determining the network performance of the client. The server may also determine and optimize the overall performance of the entire network.

If the server determines that a modification of the operation of the client's network hardware is necessary, the server transmits a message to the client including a command to modify one of a plurality of network parameters, such as buffer size or latency values. In response to a receipt of this message by the client, the desired parameter is modified in accordance with the received message.

In this manner, a server computer system may analyze the network performance of an individual client or the entire network. The server may determine traffic flow and identify the source of network bottlenecks. The performance of a client or the entire network may then be modified by remotely modifying the operation of a particular client's network hardware by transmitting new network parameters to be utilized by the client's network hardware during operation.

Figure 1:
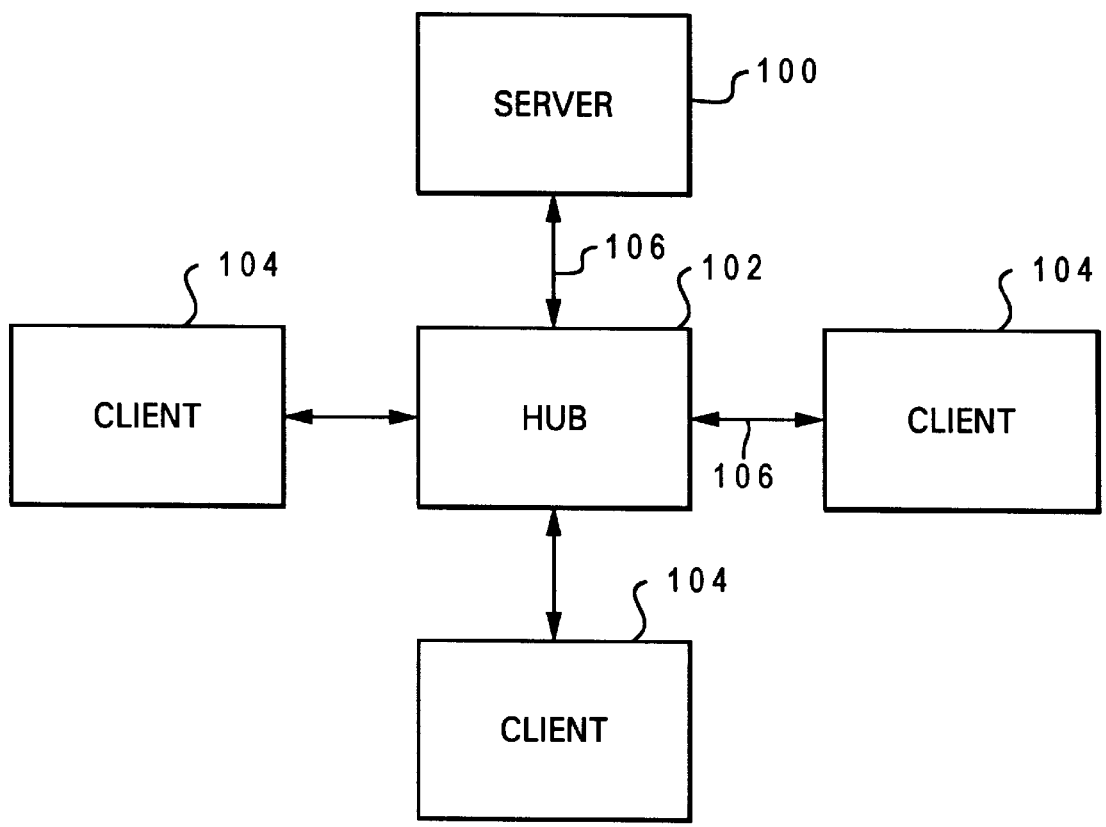
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
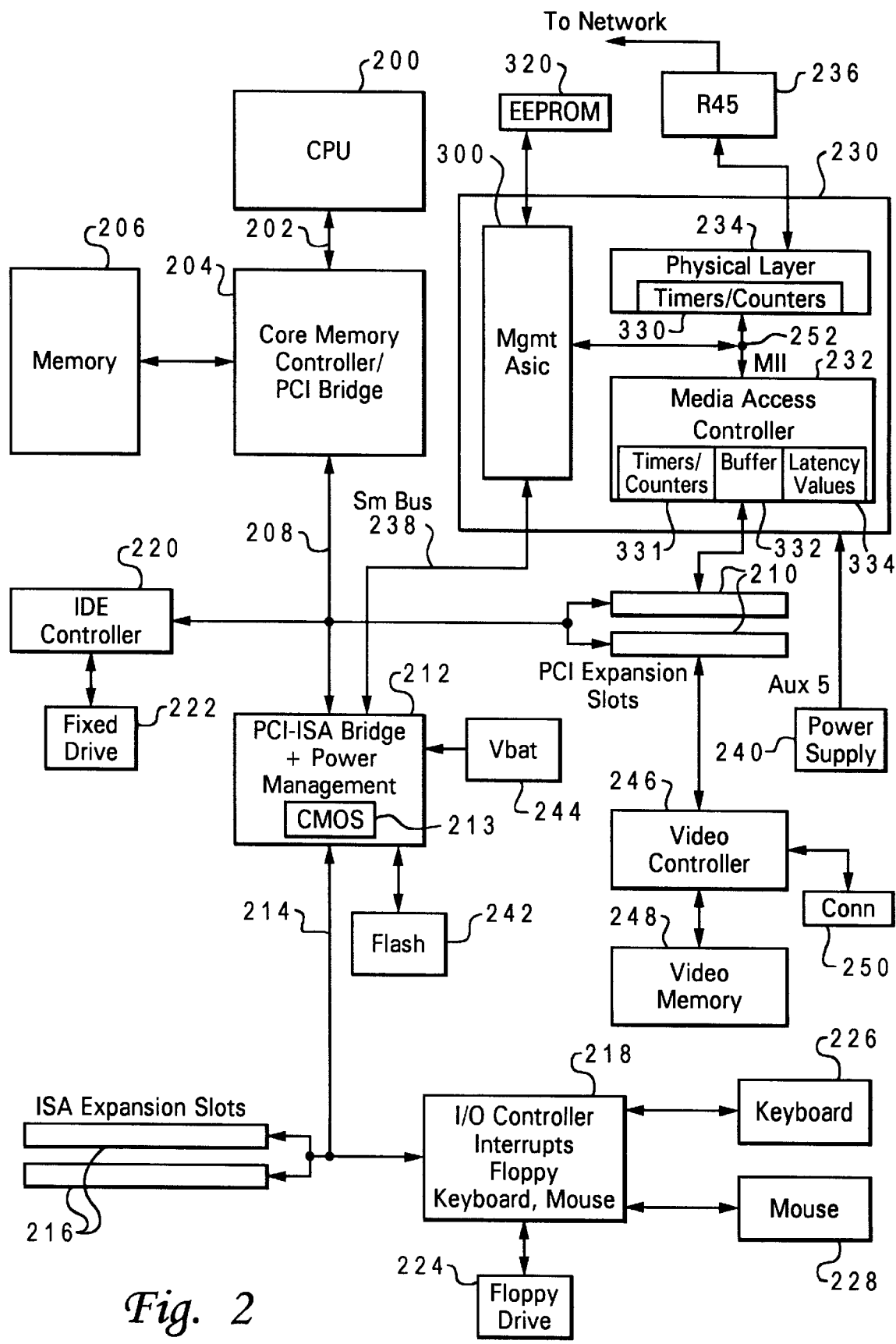
FIG. 2 depicts a pictorial representation of a processor and a network adapter included within a client computer system in accordance with the method and system of the present invention.

FIG. 2 illustrates a pictorial representation of a processor 200, and a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 includes a plurality of timers/counters 330 which are utilized to collect network data for this client's network hardware and count the number of particular network events, or time a particular network event. Buffer 332 is utilized to store the current size of the network buffer. Latency values 334 stores the current latency values. Buffer 332 and latency values 334, and timers/counters 330 may be modified remotely by server 100. Physical layer 234 also includes timers/counters 330 which may be utilized in a manner similar to timers/counters 331.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or special purpose processor, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320. Micro-controller 302 also includes a PCI interface 340 for coupling micro-controller 302 to PCI bus 208. In this manner, micro-controller 302 is able to generate PCI bus transactions, or PCI bus cycles.

Figure 3:
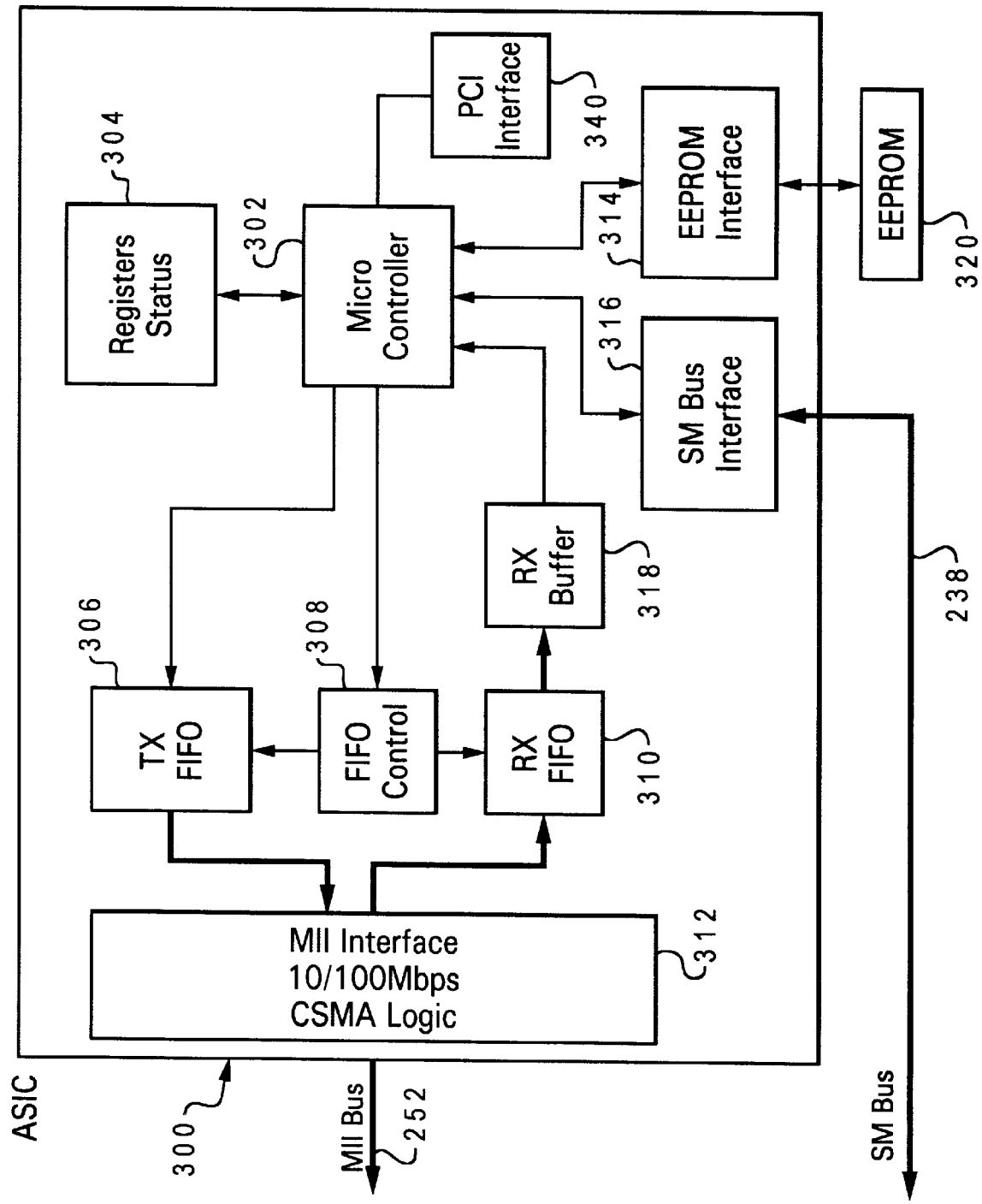
FIG. 3 illustrates a pictorial representation of a network adapter included within a client computer system in accordance with the method and system of the present invention.

FIG. 3 illustrates a pictorial representation of special purpose processing unit 300 which is included within a network adapter 230 included within a client computer system 104 in accordance with the method and system of the present invention. Special purpose processing unit is preferably implemented utilizing an ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID).

Figure 4A:
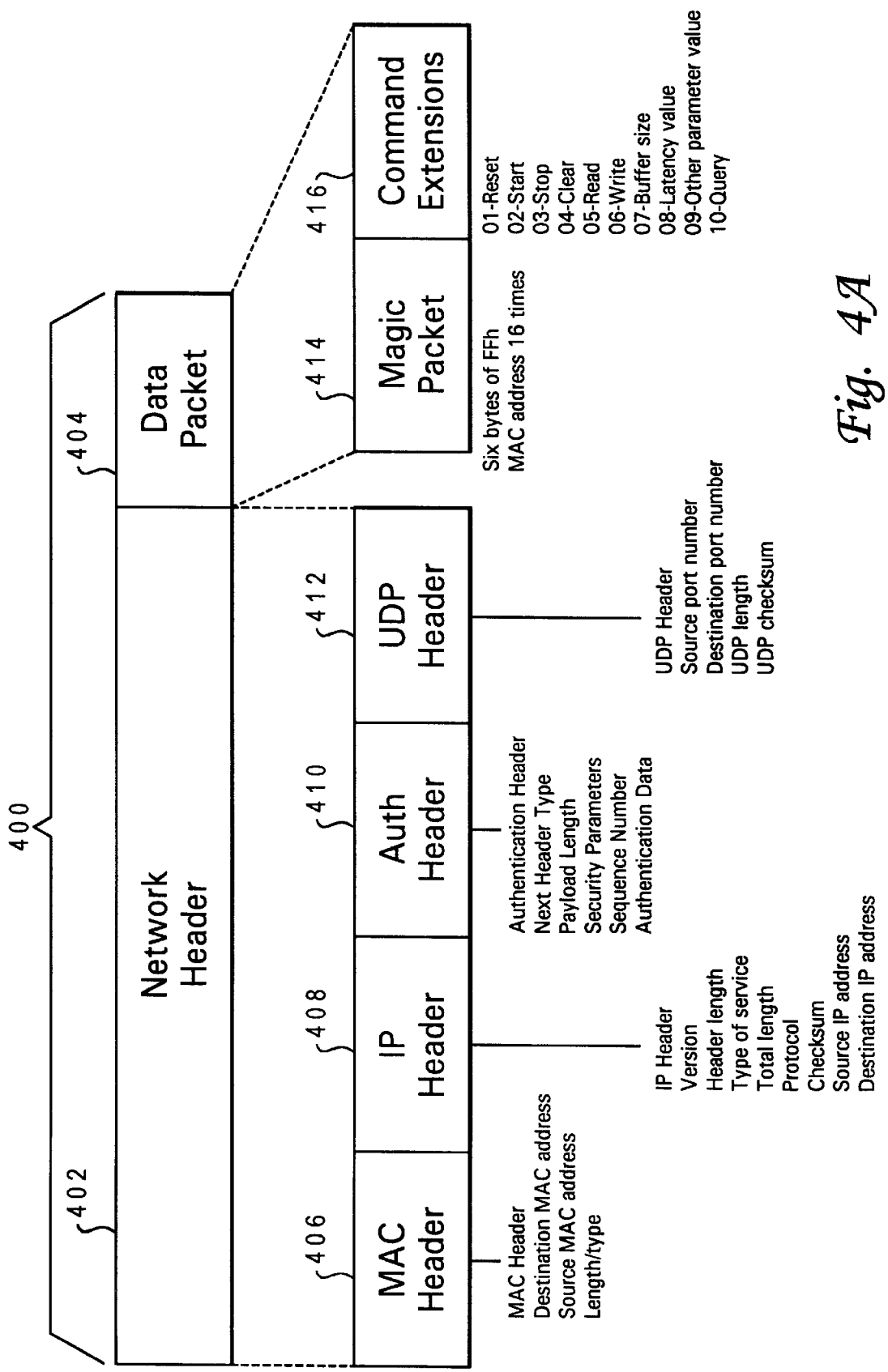
FIG. 4A illustrates a pictorial representation of a network packet, including a network header and a data packet, which may be transmitted by a server computer system over the network in accordance with the method and system of the present invention.

FIG. 4A illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Command extensions includes one of a plurality of commands which access one of the timers or counters, or a command which modifies one of the network parameters. For example, a server could transmit a message to a client to reset, start, stop, clear, or query one of the timers or counters included within the client. The message could read or write a value to one of the counters within the client. A new buffer size, latency value, or other parameter may be provided in the commands.

When a network packet 400 is received by client 104, it is received by physical layer 234 and placed on the MII bus 252. When network packet 400 includes magic packet 414, MAC 232 detects that it includes magic packet 414, and then MAC 232 ignores any command extensions 416.

ASIC 300 also receives network packet 400 utilizing the MII interface 312. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 4B:
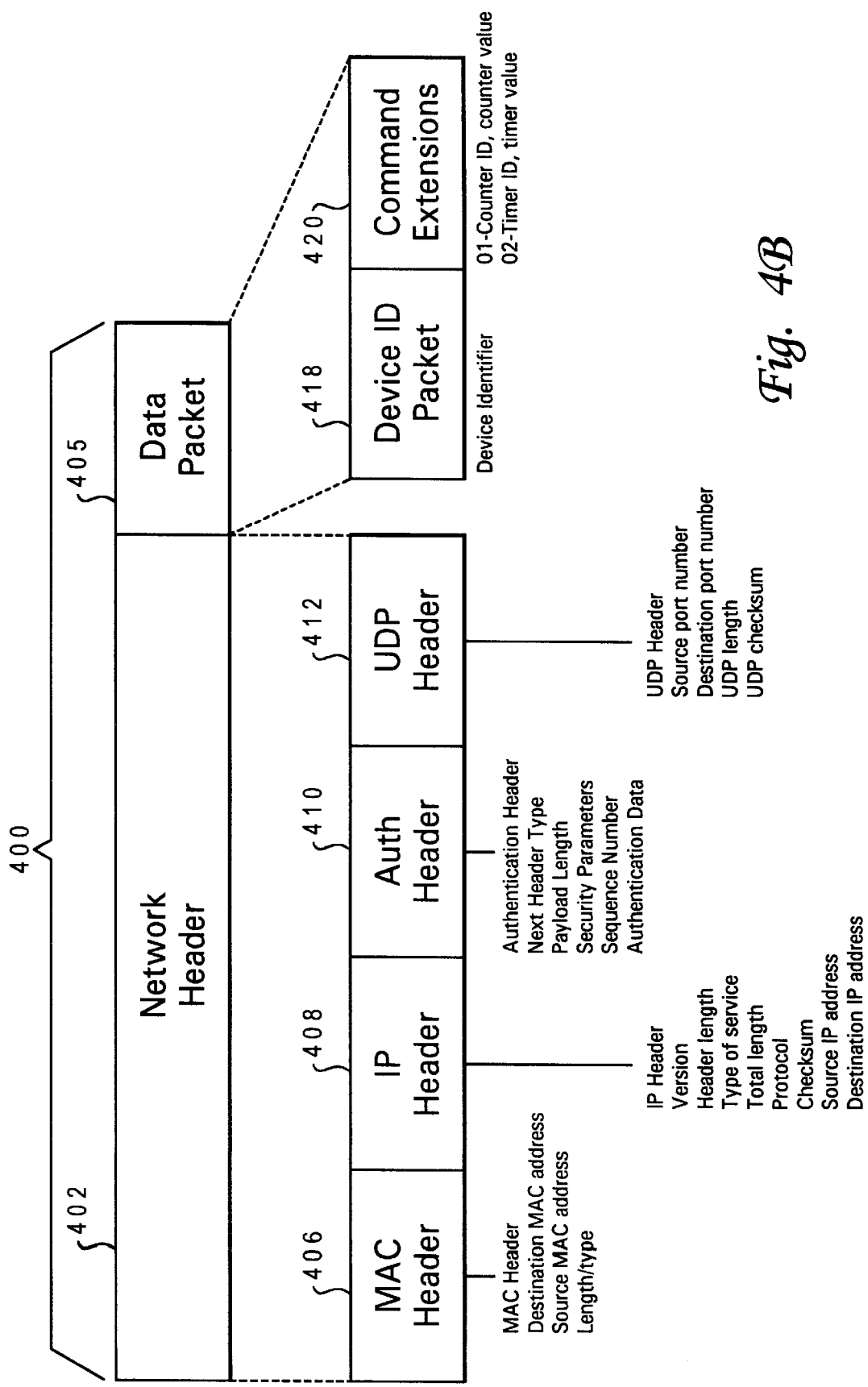
FIG. 4B illustrates a pictorial representation of a network packet, including a network header and a data packet, which may be transmitted by a client computer system the network in accordance with the method and system of the present invention.

FIG. 4B illustrates a pictorial representation of a network packet, including a network header and a data packet, which may be transmitted by a client computer system over the network in accordance with the method and system of the present invention. Each network packet 400 includes a network header 402, as described above, and a data packet 405.

Data packet 405 includes a device identifier packet 418 and command extensions 420. Packet 418 includes an identifier which identifies the particular client which created and transmitted this packet. Data packet 405 also includes command extensions 420. Command extensions includes one of a plurality of commands client may transmit to provide network statistical information about the performance of this client's network hardware. For example, the command may include an identification of a particular counter or timer, as well as the current value of the counter or timer. The current value of a counter represents the number of network events counted by a particular counter. For example, a counter may be set to count the number of lost packets. The current value of a timer represents the elapsed time for a particular network event.

One skilled in the art will recognize that other packet formats exist which may be utilized to perform the same functions depicted in FIGS. 4A and 4B.

Figure 5:
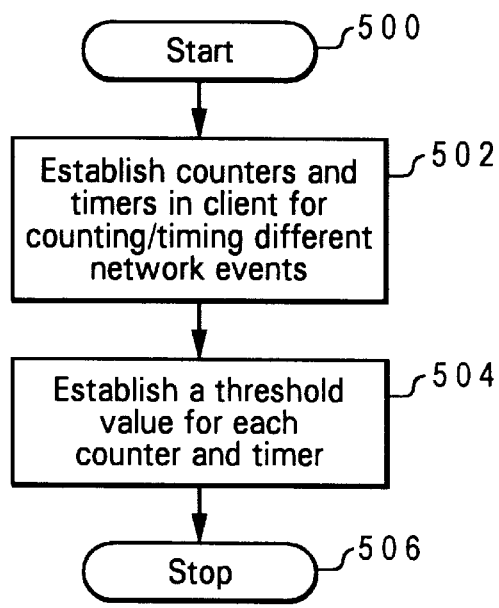
FIG. 5 depicts a high level flow chart which illustrates establishing a plurality of counters and timers within a client computer system and threshold values for each counter and timer in accordance with the method and system of the present invention.

FIG. 5 depicts a high level flow chart which illustrates establishing a plurality of counters and timers within a client computer system and threshold values for each counter and timer in accordance with the method and system of the present invention. The process starts at block 500 and thereafter passes to block 502 which illustrates establishing a plurality of counters and timers within a client computer system to collect the client's network statistics. The counters and timers may be set to collect different network events. For example, a counter may be utilized to count the number of lost packets. Next, block 504 depicts establishing a threshold value for each counter and timer established to collect network statistics. The process then terminates as illustrated by block 506.

Figure 6:
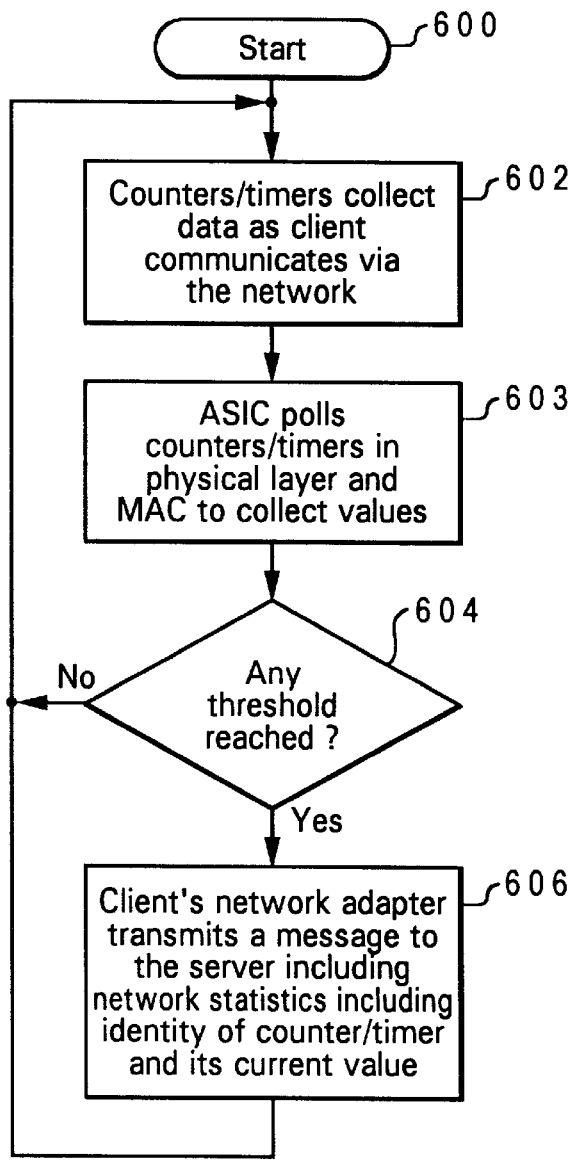
FIG. 6 illustrates a high level flow chart which depicts a plurality of counters and timers within a client computer system collecting data and the client transmitting a message to a server including the client's network statistics in accordance with the method and system of the present invention.

FIG. 6 illustrates a high level flow chart which depicts a plurality of counters and timers within a client computer system collecting data and the client transmitting a message to a server including the client's network statistics in accordance with the method and system of the present invention. The process starts as depicted by block 600 and thereafter passes to block 602 which illustrates the network statistic counters and timers collecting data as the client communicates utilizing the network. Thereafter, block 603 illustrates ASIC 300 polling timers/counters 330 and timers/counters 331 to obtain their values. Next, block 604 depicts a determination of whether or not any counter or timer has reached its preset threshold. If a determination is made that none of the counters or timers have reached the preset threshold, the process passes back to block 602.

Referring again to block 604, if a determination is made that a counter or timer has reached its preset threshold, the process passes to block 606 which illustrates the client's network adapter transmitting a message to the server computer system. The message includes the client's network statistics which includes an indication of the counter or timer which reached its threshold as well as that counter's or timer's current value. The process then passes back to block 602.

Figures 7, 8:
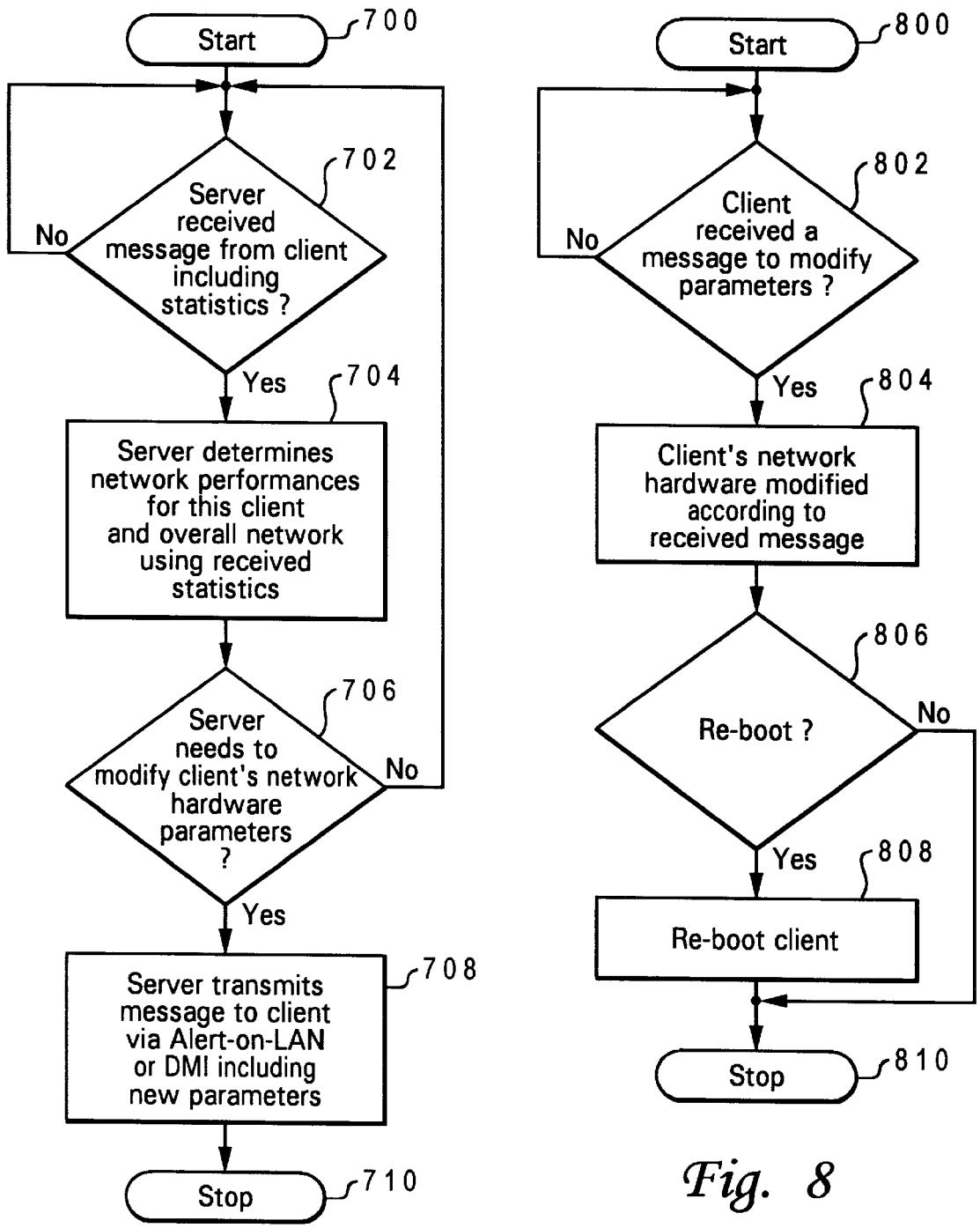
FIG. 7 depicts a high level flow chart which illustrates a server computer system receiving a message including a client's network statistics and the server modifying the client's network hardware in accordance with the method and system of the present invention.
FIG. 8 illustrates a high level flow chart which depicts a client computer system's hardware being modified in response to a receipt of a message including modified network parameters from a server computer system in accordance with the method and system of the present invention.

FIG. 7 depicts a high level flow chart which illustrates a server computer system receiving a message including a client's network statistics and the server modifying the client's network hardware in accordance with the method and system of the present invention. The process starts as illustrated at block 700 and thereafter passes to block 702 which depicts a determination of whether or not the server computer system has received a message from a client including the client's network statistics. If a determination is made that the server has not received such a message, the process passes back to block 702.

Referring again to block 702, if a determination is made that the server has received such a message, the process passes to block 704 which illustrates the server determining the network performance of this client and the overall network using the network statistics received in the message. Thereafter, block 706 depicts a determination of whether or not the server has determined that the client computer system's network hardware parameters should be modified in order to improved the network performance of either the client or the overall network. If a determination is made that no modification is necessary, the process passes back to block 702.

Referring again to block 706, if a determination is made that a modification is necessary, the process passes to block 708 which illustrates the server transmitting a message to the client via a desktop management interface (DMI) alert or an alert-on-lan packet including the new parameters. The DMI alert is an industry standard format for sending and receiving information from a PC. An alert-on-lan {AOL} packet is also known in the art. The client responds to either a DMI or AOL by generating a system management interrupt. The SMI is an interrupt to CPU 200 that causes it to change its code execution stream to service the SMI. The SMI code would check the source of the interrupt. If the packet received by ASIC 300 instructed it to change a value, the SMI would change the value. Some changes take place instantaneously, while others are in effective only after re-booting the client. For example, a message could be transmitted to a client to change the latency interval. The server would transmit a message to a client including the new latency value utilizing either DMI or AOL. In response to a receipt of this message by the client, the client would generate a SMI. The interrupt would then change the latency timer. In this manner, the latency timer could be changed dynamically to respond to changing network conditions. The process then terminates as depicted by block 710.

FIG. 8 illustrates a high level flow chart which depicts a client computer system's hardware being modified in response to a receipt of a message including modified network parameters from a server computer system in accordance with the method and system of the present invention. The process starts as depicted by block 800 and thereafter passes to block 802 which illustrates a determination of whether or not the client has received a message from the server to modify the client's network hardware parameters. If a determination is made that the client has not received such a message, the process passes back to block 802.

Referring again to block 802, if a determination is made that the client has received such a message, the process passes to block 804 which depicts the client's network hardware being modified in accordance with the received message. For example, the message may include a command to change the buffer size as well as the new buffer size. The new buffer size would then be stored in buffer 332.

The process then passes to block 806 which illustrates a determination of whether or not to re-boot the client. If a determination is made that the client is to be re-booted, the process passes to block 808 which depicts re-booting the client. The process then terminates as illustrated by block 810. Referring again to block 806, if a determination is made that the client is not to be re-booted, the process terminates as illustrated at block 810.

While a preferred embodiment has been particularly shown and described, it will be understood by those skilled in the art that various changes in form and detail may be made therein without departing from the spirit and scope of the present invention.

What is claimed is:

1. A method in a data processing system including a server computer system and a client computer system coupled together utilizing a network for permitting said server computer system to remotely modify operation of said client computer system's network hardware, said method comprising the steps of:

establishing a counter in said client computer system for counting a plurality of network events;

establishing a counter threshold;

upon said counter reaching said counter threshold, said client computer system's network hardware transmitting a message to said server computer system including network statistics information, said network statistics information including an indication of said counter reaching said counter threshold;

in response to a receipt of said message, said server computer system determining whether to modify operation of said network hardware; and in response to a determination to modify operation of said network hardware, said server computer system remotely modifying operation of said network hardware.

2. The method according to claim 1, wherein the step of said server computer system determining whether to modify operation of said network hardware further comprises the step of said server computer system utilizing said network statistics information to determine said client computer system's network performance, wherein said client computer system does not determine said client's network performance.

3. The method according to claim 2, wherein the step of said server computer system determining whether to modify operation of said network hardware further comprises the step of said server computer system utilizing said network statistics information to determine said network's overall network performance.

4. The method according to claim 3, further comprising the step of said network hardware utilizing network parameters during operation, further wherein the step of said server computer system remotely modifying operation of said network hardware further comprises the step of said server computer system transmitting a message to said client computer system utilizing said network including modified network parameters.

5. The method according to claim 4, further comprising the steps of:

said client computer receiving said modified network parameters; and said network hardware utilizing said modified network parameters during operation.

6. The method according to claim 5, wherein the step of said server computer system transmitting a message to said client computer system utilizing said network including modified network parameters further comprises the step of said server computer system transmitting a message to said client computer system utilizing said network including a modified buffer size.

7. The method according to claim 6, wherein the step of said server computer system transmitting a message to said client computer system utilizing said network including modified network parameters further comprises the step of said server computer system transmitting a message to said client computer system utilizing said network including a modified latency interval.

8. The method according to claim 7, wherein the step of said server computer system transmitting a message to said client computer system utilizing said network including modified network parameters further comprises the step of said server computer system transmitting a message to said client computer system utilizing DMI and said network.

9. A data processing system including a server computer system and a client computer system coupled together utilizing a network for permitting said server computer system to remotely modify operation of said client computer system's network hardware, comprising:

counter in said client computer system for counting a plurality of network events;

said client computer system executing code for establishing a counter threshold;

said client computer system's network hardware for transmitting a message to said server computer system including network statistics information upon said counter reaching said counter threshold, said network statistics information including an indication of said counter reaching said counter threshold;

in response to a receipt of said message, said server computer system executing code for determining whether to modify operation of said network hardware; and in response to a determination to modify operation of said network hardware, said server computer system executing code for remotely modifying operation of said network hardware.

10. The system according to claim 9, wherein said server computer system executing code for determining whether to modify operation of said network hardware further comprises said server computer system executing code for utilizing said network statistics information to determine said client computer system's network performance, wherein said client computer system does not determine said client's network performance.

11. The system according to claim 10, wherein said server computer system executing code for determining whether to modify operation of said network hardware further comprises said server computer system executing code for utilizing said network statistics information to determine said network's overall network performance.

12. The system according to claim 11, further comprising said network hardware for utilizing network parameters during operation, further wherein said server computer system executing code for remotely modifying operation of said network hardware further comprises said server computer system executing code for transmitting a message to said client computer system utilizing said network including modified network parameters.

13. The system according to claim 12, further comprising:
   said client computer for receiving said modified network parameters; and
   said network hardware for utilizing said modified network parameters during operation.

14. The system according to claim 13, wherein said server computer system executing code for transmitting a message to said client computer system utilizing said network including modified network parameters further comprises said server computer system executing code for transmitting a message to said client computer system utilizing said network including a modified buffer size.

15. The system according to claim 14, wherein said server computer system executing code for transmitting a message to said client computer system utilizing said network including modified network parameters further comprises said server computer system executing code for transmitting a message to said client computer system utilizing said network including a modified latency interval.

16. The system according to claim 15, wherein said server computer system executing code for transmitting a message to said client computer system utilizing said network including modified network parameters further comprises said server computer system executing code for transmitting a message to said client computer system utilizing DMI and said network.

17. A data processing system including a server computer system and a client computer system coupled together utilizing a network for permitting said server computer system to remotely modify operation of said client computer system's network hardware, said network hardware utilizing network parameters during operation, comprising:

counter in said client computer system for counting a plurality of network events;

said client computer system executing code for establishing a counter threshold;

said client computer system's network hardware for transmitting a message to said server computer system including network statistics information upon said counter reaching said counter threshold, said network statistics information including an indication of said counter reaching said counter threshold;

in response to a receipt of said message, said server computer system executing code for determining whether to modify operation of said network hardware utilizing said network statistics information to determine said client computer system's network performance and to determine said network's overall network performance, wherein said client computer system does not determine said client's network performance;

in response to a determination to modify operation of said network hardware, said server computer system executing code for remotely modifying operation of said network hardware by transmitting a message to said client computer system utilizing said network including modified network parameters;

said client computer for receiving said modified network parameters; and said network hardware for utilizing said modified network parameters during operation.

* * * * *

UNITED STATES PATENT AND TRADEMARK OFFICE
CERTIFICATE OF CORRECTION

PATENT NO. : 6,304,900 B1
DATED : October 16, 2001
INVENTOR(S) : Cromer et al.

Page 1 of 1

It is certified that error appears in the above-identified patent and that said Letters Patent is hereby corrected as shown below:

<u>Title page,</u>
Item [54], line 4, please add the word -- COMPUTER -- before the word "SYSTEM'S".

Signed and Sealed this

Seventh Day of May, 2002

Attest:

Attesting Officer

JAMES E. ROGAN
Director of the United States Patent and Trademark Office